United States Patent
Howard et al.

(10) Patent No.: US 10,868,482 B1
(45) Date of Patent: Dec. 15, 2020

(54) DUAL-FREQUENCY FILTER FOR DISTINGUISHING BETWEEN DIFFERENT TYPES OF GRID EVENTS

(71) Applicant: General Electric Company, Schenectady, NY (US)

(72) Inventors: Dustin Howard, Atlanta, GA (US); Einar Vaughn Larsen, Ballston Lake, NY (US); Igor Berroteran, Salem, VA (US); Reza Kazemi, Little Rock, AR (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/423,646

(22) Filed: May 28, 2019

(51) Int. Cl.
*H02P 9/00* (2006.01)
*H02P 9/02* (2006.01)
*F03D 7/02* (2006.01)
*F03D 9/25* (2016.01)
*H02J 3/00* (2006.01)

(52) U.S. Cl.
CPC ............ *H02P 9/007* (2013.01); *F03D 7/0272* (2013.01); *H02J 3/00* (2013.01); *H02P 9/02* (2013.01); *F03D 9/257* (2017.02); *F05B 2270/337* (2013.01)

(58) Field of Classification Search
CPC .......... H02P 9/007; H02P 9/02; F03D 7/0272; F05B 2270/337
USPC ....................................... 322/29, 47; 290/44
See application file for complete search history.

(56) References Cited

U.S. PATENT DOCUMENTS

| | | | | |
|---|---|---|---|---|
| 4,013,937 A | * | 3/1977 | Pelly ..................... | H02J 3/1835 |
| | | | | 363/10 |
| 4,041,368 A | * | 8/1977 | Gritter .................. | H02M 5/271 |
| | | | | 322/47 |
| 4,331,881 A | * | 5/1982 | Soderholm ........... | F03D 7/0272 |
| | | | | 290/44 |
| 5,254,935 A | * | 10/1993 | Vercesi ................ | H02J 7/1446 |
| | | | | 320/104 |
| 5,798,632 A | * | 8/1998 | Muljadi .................... | F03D 9/25 |
| | | | | 322/29 |
| 7,215,035 B2 | * | 5/2007 | Hudson ..................... | H02P 9/48 |
| | | | | 290/44 |
| 8,378,515 B2 | | 2/2013 | Fortmann | |
| 9,270,286 B2 | * | 2/2016 | Ahmed ...................... | H02J 3/01 |
| 10,673,362 B2 | * | 6/2020 | Kamimurai ............... | H02P 9/44 |
| 10,707,789 B2 | * | 7/2020 | Ren ....................... | F03D 7/0272 |
| 10,711,765 B2 | * | 7/2020 | De Rijcke ................. | H02P 9/02 |
| 10,715,066 B2 | * | 7/2020 | De Rijcke ............... | H02J 3/381 |

(Continued)

*Primary Examiner* — Pedro J Cuevas
(74) *Attorney, Agent, or Firm* — Dority & Manning, P.A.

(57) ABSTRACT

A method for controlling a dual-fed induction generator (DFIG) connected to a power grid in response to a high-voltage grid event includes receiving, via a controller, a frequency signal of the power grid. The method also includes filtering the frequency signal via a filtering assembly so as to determine whether certain types of grid conditions are present in the power grid. The filtering assembly includes a first filter connected in parallel with a second filter. The first filter has a bandwidth that is greater than the second filter. Further, the method also includes comparing output signals of the first and second filters of the filtering assembly to one or more frequency thresholds. Moreover, the method includes controlling the DFIG based on the comparison.

18 Claims, 6 Drawing Sheets

(56) References Cited

U.S. PATENT DOCUMENTS

| | | | |
|---|---|---|---|
| 2006/0186670 A1* | 8/2006 | Hudson | F03D 9/255 |
| | | | 290/44 |
| 2014/0062424 A1 | 3/2014 | Larsen et al. | |
| 2014/0160824 A1* | 6/2014 | Inomata | H02M 5/293 |
| | | | 363/150 |
| 2015/0381187 A1* | 12/2015 | Ahmed | H02J 3/01 |
| | | | 327/156 |
| 2018/0328342 A1* | 11/2018 | Ren | G05B 19/042 |
| 2019/0252884 A1* | 8/2019 | Achilles | H02J 3/386 |
| 2020/0191116 A1* | 6/2020 | Howard | H02P 9/007 |
| 2020/0195012 A1* | 6/2020 | Wagoner | H02J 3/386 |

\* cited by examiner

FIG. 5

DUAL-FREQUENCY FILTER FOR DISTINGUISHING BETWEEN DIFFERENT TYPES OF GRID EVENTS

FIELD

The present disclosure relates generally to electrical power systems and, more particularly, to a system and method for controlling an electrical power system connected to a power grid in response to high-voltage grid events using a dual-frequency filter.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

More specifically, during operation of a wind turbine, wind impacts the rotor blades and the blades transform wind energy into a mechanical rotational torque that drives a low-speed shaft. The low-speed shaft drives the gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. The LSC converts the DC power on the DC link into AC output power that is combined with the power from the generator stator to provide multi-phase power having a frequency maintained substantially at the frequency of the electrical grid bus (e.g. 50 HZ or 60 HZ). The above system is generally referred to as a doubly-fed induction generator (DFIG) system.

DFIGs are used in wind turbines to permit variable-speed operation with minimum power-electronic power rating. These machines operate at speeds below synchronous (sub-synchronous) at low power, and at speeds above synchronous (super-synchronous) at high power. Wind turbines utilizing DFIGs are connected to the power grid, often operating in parallel with many other wind turbines on the same electrical collector system.

The power grid can have many types of disturbances, some of which result in high-voltage conditions on the grid and on the wind turbine electrical systems. These disturbances can include: (1) remote events that can cause the voltage on the entire high-voltage grid to increase well above normal with gradual reduction back to normal; (2) local grid faults that can cause voltage at the wind turbines to be depressed, followed by sudden removal of the faulted circuit element; or (3) local grid faults that, upon clearing, leave the wind farm with no remaining connection to the grid, but still with the wind turbines connected to the cables and lines of the wind farm and possibly a portion of the transmission grid.

Each of the above-described events poses a potential for damage to the wind turbine electrical system due to high voltages within that system that exceed equipment capability. It is desirable for the wind turbine to ride through the grid events, both low-voltage and high-voltage, when the grid remains partially intact after clearing the grid fault. When the grid becomes open-circuited after clearing the fault, then it is desirable that the wind turbines continue operating without damage and eventually shut down based on inability to transfer power. In the latter situation, there is usually no time requirement for shutdown when the wind turbine is part of a wind farm connected to a transmission grid. For distribution applications, local codes and regulations may require shutdown within a specified time, typically several seconds.

Frequency deviations may be a result of an imbalance between generation and load, which can be particularly severe following a sudden islanding event. Additionally, power-electronic devices often rely on an external grid connection to supply a frequency reference, which is lost upon entering an islanding event. Phase locked-loops are used to track this frequency reference. However, phase-locked loops used to determine frequency can temporarily indicate artificial deviation from nominal frequency during various grid disturbances, particularly in weak grid connections. Therefore, the frequency deviations caused by non-islanding grid events can potentially be mistaken as an islanding condition based on the phase-locked loop performance.

Thus, an improved system and method that responds to a high-voltage grid event on an electrical system connected with one or more DFIGs and addresses the aforementioned issues would be welcomed in the technology. Accordingly, the present disclosure is directed to a system and method for controlling a DFIG in response to high-voltage grid events that utilizes a dual-frequency filter at the output of the phase-locked loop.

BRIEF DESCRIPTION

Aspects and advantages of the invention will be set forth in part in the following description, or may be obvious from the description, or may be learned through practice of the invention.

In one aspect, a method for controlling a dual-fed induction generator (DFIG) connected to a power grid in response to a high-voltage grid event. The method includes receiving, via a controller, a frequency signal of the power grid. The method also includes filtering the frequency signal via a filtering assembly so as to determine whether certain types of grid conditions are present in the power grid. The filtering assembly includes a first filter connected in parallel with a second filter. The first filter has a bandwidth that is greater than the second filter. Further, the method also includes comparing output signals of the first and second filters of the filtering assembly to one or more frequency thresholds. Moreover, the method includes controlling the DFIG based on the comparison.

In an embodiment, the method may include measuring a voltage from the power grid via one or more sensors and determining the frequency signal based on the voltage. In another embodiment, the first and second filters may be low-pass filters.

In further embodiments, the first filter may be a high-bandwidth filter and the second filter may be a low-bandwidth filter. In such embodiments, filtering the frequency signal via the filtering assembly so as to determine whether certain types of grid conditions are present in the power grid may include distinguishing between the certain types of grid conditions using the high-bandwidth filter and the low-bandwidth filter.

In particular embodiments, the certain types of grid conditions may include, for example, a high-voltage-ride through (HVRT) event, a weak grid, or an islanding event.

Thus, in an embodiment, distinguishing between the certain types of grid conditions using the high-bandwidth filter and the low-bandwidth filter may include determining whether the HVRT event or the weak grid is present in the power grid based on an output signal of the high-bandwidth filter.

In another embodiment, distinguishing between the certain types of grid conditions using the high-bandwidth filter and the low-bandwidth filter may include determining whether the islanding event is present in the power grid based an output signal of the low-bandwidth filter.

In additional embodiments, if the output signal of the high-bandwidth filter indicates that the HVRT event is the grid condition, controlling the DFIG based on the comparison may include maintaining connection to the power grid so as to meet ride-through grid requirements of the power grid. In another embodiment, if the output signal of the high-bandwidth filter indicates that the weak grid is the grid condition, controlling the DFIG based on the comparison may include continuing operation of the DFIG. In yet another embodiment, if the output signal of the low-bandwidth filter indicates that the islanding event is the grid condition, controlling the DFIG based on the comparison further comprises disconnecting the DFIG from the power grid.

In several embodiments, the method may further include controlling the DFIG based on the comparison and at least one of a grid voltage or a grid power.

In an embodiment, the method may include receiving, via a phase-locked loop (PLL) of the controller, a voltage feedback signal from the power grid and generating, via the PLL, the frequency signal of the power grid based on the voltage feedback signal.

In another aspect, the present disclosure is directed to a system for controlling a dual-fed induction generator (DFIG) connected to a power grid in response to a high-voltage grid event. The system includes one or more sensors for measuring a voltage feedback of the power grid, a phase-locked loop for generating a frequency signal of the power grid based on the voltage feedback signal, a filtering assembly, and a controller. The filtering assembly is configured to filter the frequency signal so as to determine whether certain types of grid conditions are present in the power grid. Further, the filtering assembly includes a first filter connected in parallel with a second filter. The first filter has a bandwidth that is greater than the second filter. The controller is configured to perform a plurality of operations, including but not limited to comparing output signals of the first and second filters of the filtering assembly to one or more frequency thresholds and controlling the DFIG based on the comparison. It should be understood that the system may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Generally disclosed herein are systems and methods for controlling an electrical power system, such as a wind turbine, connected to a power grid in response to high-voltage grid events using a dual-frequency filter. It should be understood that the present disclosure can be used for DFIG systems, full conversion systems, battery storage systems, and/or solar inverters. More specifically, the present disclosure relates to measuring a frequency signal and filtering the measured frequency with two parallel low-pass filters, one with significantly higher bandwidth than the other (e.g. 5-10 times the bandwidth). The high-bandwidth filtered frequency is used to confirm whether a high-voltage-ride-through event or a weak grid is present, in which no significant frequency deviations from nominal are expected. The low-bandwidth filtered version is used to determine whether an islanding condition is present and therefore whether a subsequent trip or shut down of the wind turbine generator is needed.

Figure 1:
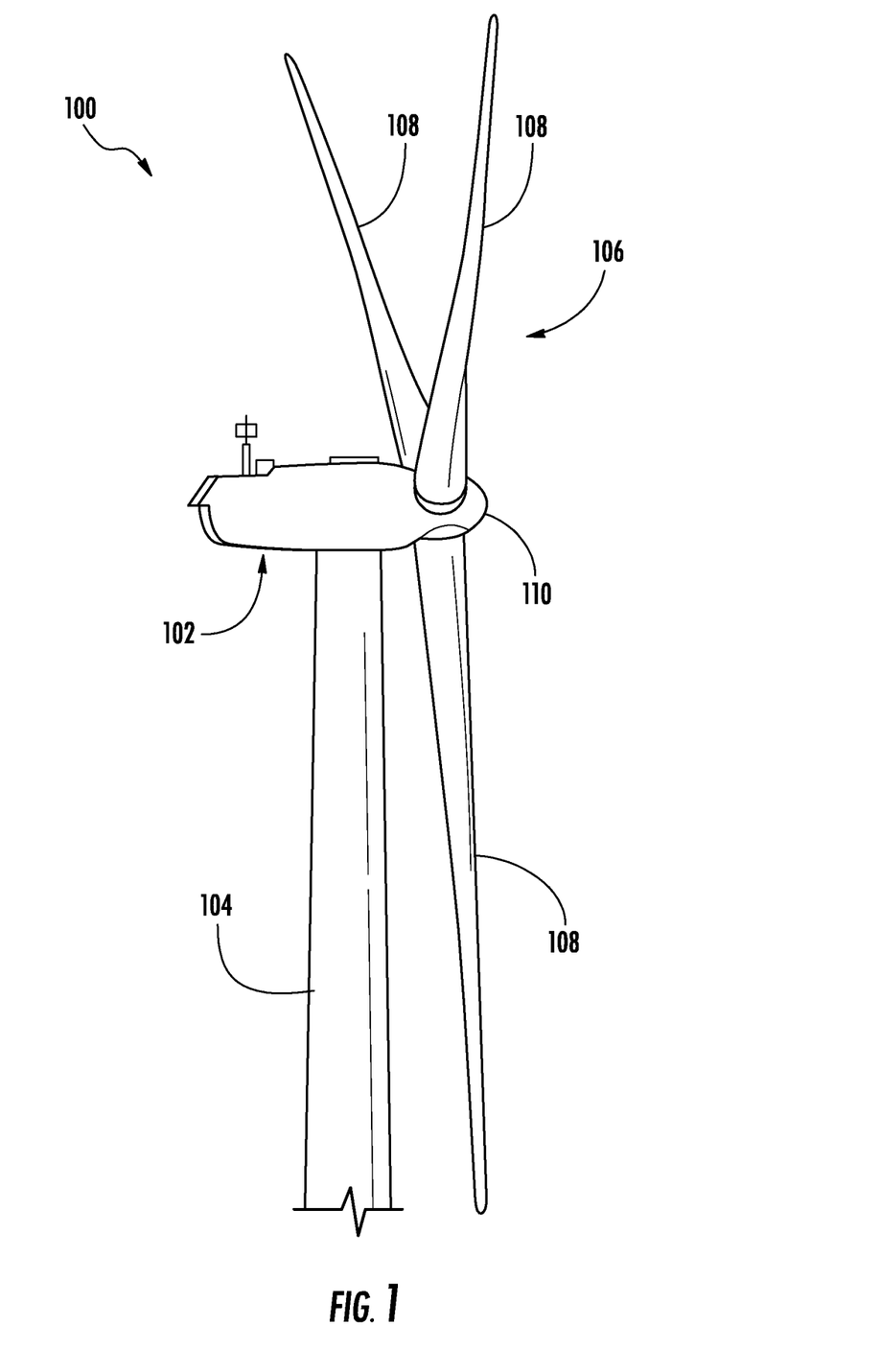
FIG. 1 illustrates a perspective view of one embodiment of a wind turbine according to the present disclosure.

Referring now to the drawings, FIG. 1 illustrates a schematic view of one embodiment of a wind turbine 100 according to the present disclosure. As shown, the wind turbine 100 includes a nacelle 102 housing a generator (not shown). The nacelle 102 may be mounted on a tower 104 (a portion of the tower 104 being shown in FIG. 1). The tower 104 may be any height that facilitates operation of wind turbine 100 as described herein. The wind turbine 100 also includes a rotor 106 that includes a plurality of rotor blades 108 attached to a rotating hub 110. More specifically, as shown, the wind turbine 100 includes three rotor blades 108 attached to the hub 110. Alternatively, the wind turbine 100 may include any number of rotor blades 108 that facilitate operation of the wind turbine 100 as described herein. In an embodiment, the wind turbine 100 may also include a gearbox 114 (FIG. 2) rotatably coupled to the rotor 106 and a generator 118 (FIG. 2).

Figure 2:
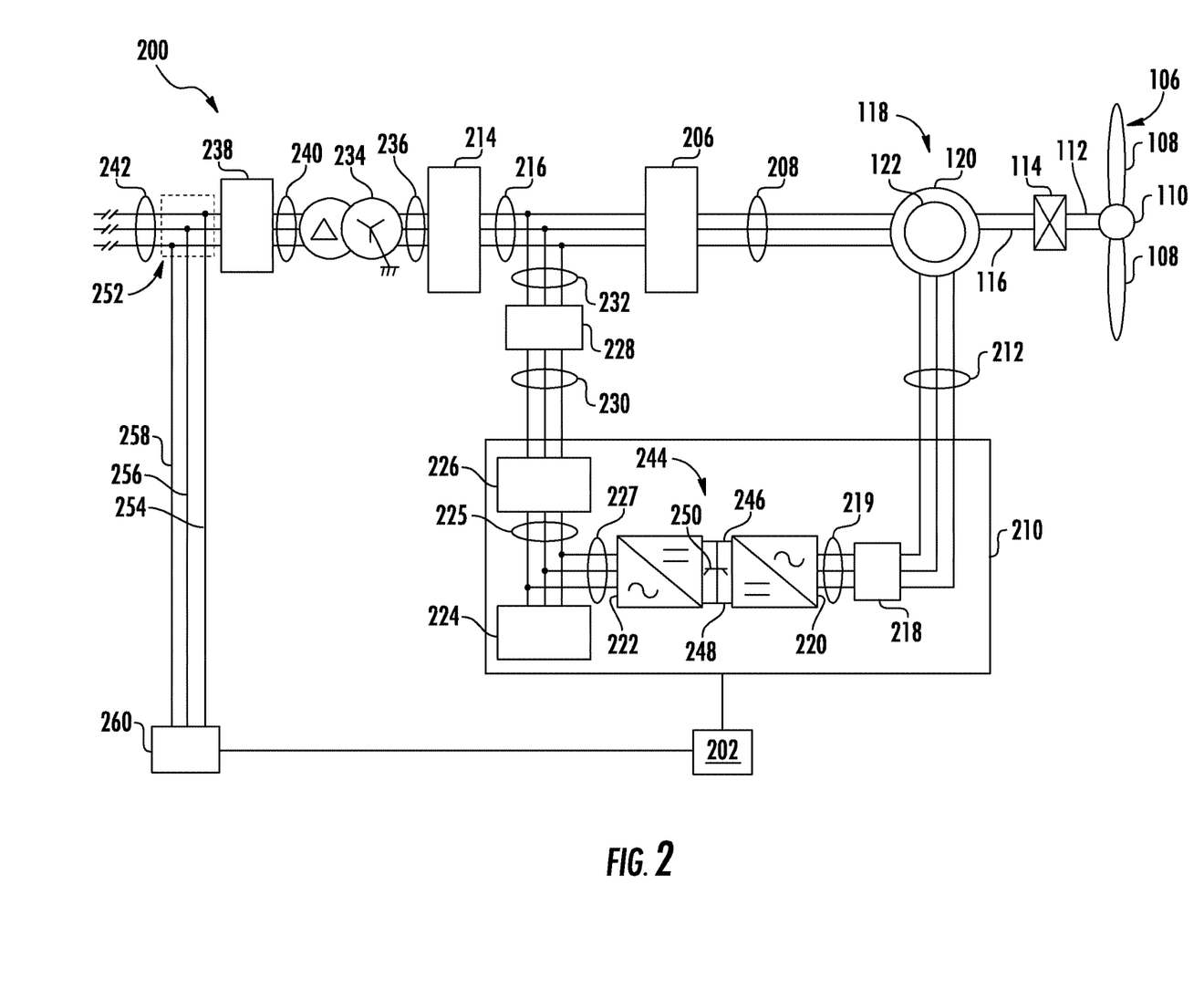
FIG. 2 illustrates a schematic view of one embodiment of an electrical and control system that may be used with the wind turbine shown in FIG. 1.

Referring particularly to FIG. 2, a schematic view of one embodiment of an electrical and control system 200 that may be used with the wind turbine 100 (shown in FIG. 1). As shown, the rotor 106 may be further rotatably coupled to a low-speed shaft 112. The low-speed shaft 112 may be coupled to a step-up gearbox 114. The gearbox 114 may be configured to step up the rotational speed of low-speed shaft 112 and transfer that speed to a high-speed shaft 116. In an embodiment, the gearbox 114 can have a step-up ratio of approximately 70:1. For example, the low-speed shaft 112 rotating at approximately 20 revolutions per minute (20) coupled to gearbox 114 with an approximately 70:1 step-up ratio generates the high-speed shaft 116 speed of approximately 1400 rpm. Alternatively, the gearbox 114 has any step-up ratio that facilitates operation of wind turbine 100 as described herein. Also, alternatively, the wind turbine 100 may include a direct-drive generator 118, wherein the generator 118 is rotatingly coupled to the rotor 106 without any intervening gearbox.

The high-speed shaft 116 is rotatably coupled to the generator 118. In an embodiment, the generator 118 may be a wound rotor, synchronous, 60 Hz, three-phase, doubly-fed induction generator (DFIG) that includes a generator stator 120 magnetically coupled to a generator rotor 122. Alternatively, the generator 118 may any generator of any number of phases that facilitates operation of the wind turbine 100 as described herein.

Thus, during operation, wind impacts the rotor blades 108 and the rotor blades 108 transform mechanical wind energy into a mechanical rotational torque that rotatingly drives the low-speed shaft 112 via the hub 110. The low-speed shaft 112 drives the gearbox 114 that subsequently steps up the low rotational speed of shaft 112 to drive the high-speed shaft 116 at an increased rotational speed. The high speed shaft 116 rotatably drives the generator rotor 122 such that a rotating magnetic field is induced within the generator rotor 122 and a voltage is induced within the generator stator 120 that is magnetically coupled to the generator rotor 122. The generator 118 converts the rotational mechanical energy to a sinusoidal, three-phase alternating current (AC) electrical energy signal in the generator stator 120.

The electrical and control system 200 may also include a controller 202. In an embodiment, the controller 202 may include a computer or other suitable processing unit. Thus, in several embodiments, the controller 202 may include suitable computer-readable instructions that, when implemented, configure the controller 202 to perform various different functions, such as receiving, transmitting and/or executing control signals. As such, the controller 202 may generally be configured to control the various operating modes (e.g., conducting or non-conducting states) of the one or more switches and/or components of embodiments of the electrical system 200. For example, the controller 200 may be configured to implement methods of responding to a high-voltage grid event on an electrical system connected with one or more DFIGs.

As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits, and these terms are used interchangeably herein. In the exemplary embodiment, memory may include, but is not limited to, a computer-readable medium, such as a random access memory (RAM). Alternatively, a floppy disk, a compact disc-read only memory (CD-ROM), a magneto-optical disk (MOD), and/or a digital versatile disc (DVD) may also be used. Also, in the exemplary embodiment, additional input channels may be, but not be limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Figure 3:
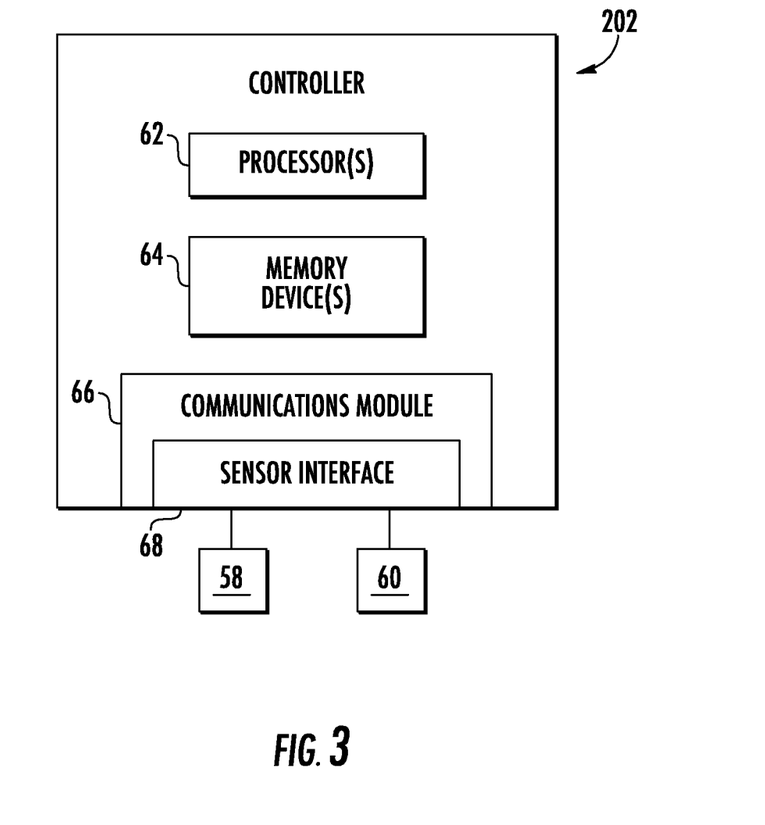
FIG. 3 illustrates a block diagram of one embodiment of suitable components that may be included within a controller of the wind turbine according to the present disclosure.

For example, FIG. 3 illustrates a block diagram of one embodiment of suitable components that may be included within an embodiment of a controller 202, or any other computing device that receives signals indicating grid conditions in accordance with aspects of the present subject matter. In various aspects, such signals can be received from one or more sensors 58, 60, or may be received from other computing devices such as a supervisory control and data acquisition (SCADA) system, a turbine protection system, a phase-locked loop (PLL) regulator 260, and the like. Received signals can include, for example, voltage signals (e.g. DC bus voltage and AC grid voltage along with corresponding phase angles for each phase of the AC grid), current signals, power flow (direction) signals, power output, total power flow into (or out of) the grid, and the like. In some instances, signals received can be used by the controller 202 to calculate other variables such as changes in voltage phase angles over time, and the like.

As shown, the controller 202 may include one or more processor(s) 62 and associated memory device(s) 64 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 64 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 64 may generally be configured to store suitable computer-readable instructions that, when implemented by the processor(s) 62, configure the controller 202 to perform various functions including, but not limited to, directly or indirectly transmitting suitable control signals to one or more switches that comprise the bi-directional power conversion assembly 210, monitoring operating conditions of the electrical system 200, and various other suitable computer-implemented functions.

Additionally, the controller 202 may also include a communications module 66 to facilitate communications between the controller 202 and the various components of the electrical system 200. For instance, the communications module 66 may serve as an interface to permit the controller 202 to transmit control signals to any components of the wind turbine and electrical system 200. Moreover, the communications module 66 may include a sensor interface 68 (e.g., one or more analog-to-digital converters) to permit signals transmitted from the sensors (e.g., 58, 60) to be converted into signals that can be understood and processed by the processors 62. Alternatively, the controller 202 may be provided with suitable computer readable instructions that, when implemented by its processor(s) 62, configure the controller 202 to take various actions depending upon the control mode of the wind turbine 100.

Referring back to FIG. 2, the generator stator 120 may be further electrically coupled to a stator synchronizing switch 206 via a stator bus 208. In the exemplary embodiment, to facilitate the DFIG configuration, the generator rotor 122 is electrically coupled to a bi-directional power conversion assembly 210 via a rotor bus 212. Alternatively, the system 200 may be configured as a full power conversion system, wherein a full power conversion assembly that is similar in design and operation to assembly 210 is electrically coupled to the stator 120 and such full power conversion assembly facilitates channeling electrical power between the stator 120 and an electric power transmission and distribution grid. The stator bus 208 transmits three-phase power from the stator 120 and the rotor bus 212 transmits three-phase power from the rotor 122 to the assembly 210. The stator synchronizing switch 206 is electrically coupled to a main transformer circuit breaker 214 via a system bus 216.

The power conversion assembly 210 includes a rotor filter 218 that is electrically coupled to the rotor 122 via the rotor bus 212. The rotor filter 218 is electrically coupled to a rotor-side, bi-directional power converter 220 via a rotor filter bus 219. The rotor-side converter 220 is electrically coupled to a line-side, bi-directional power converter 222. The converters 220 and 222 may substantially identical. The line-side converter 222 is electrically coupled to a line filter 224 and a line contactor 226 via a line-side power converter bus 223 and a line bus 225. In an embodiment, the converters 220 and 222 are configured in a three-phase, pulse width modulation (PWM) configuration including insulated gate bipolar transistor (IGBT) switching devices. Alternatively, the converters 220 and 222 may have any configuration using any switching devices that facilitate operation of the system 200 as described herein. Further, as shown, the assembly 210 is coupled in electronic data communication with the controller 202 to control the operation of the converters 220 and 222.

The line contactor 226 is electrically coupled to a conversion circuit breaker 228 via a conversion circuit breaker bus 230. The circuit breaker 228 is also electrically coupled to the system circuit breaker 214 via the system bus 216 and the connection bus 232. The system circuit breaker 214 is electrically coupled to an electric power main transformer 234 via a generator-side bus 236. The transformer 234 is electrically coupled to a grid circuit breaker 238 via a breaker-side bus 240. The grid breaker 238 is connected to an electric power transmission and distribution grid via a grid bus 242.

Still referring to FIG. 2, the converters 220 and 222 are coupled in electrical communication with each other via a single direct current (DC) link 244. Alternatively, the converters 220 and 222 may be electrically coupled via individual and separate DC links. The DC link 244 includes a positive rail 246, a negative rail 248, and at least one capacitor 250 coupled therebetween. Alternatively, the capacitor 250 may be one or more capacitors configured in series or in parallel between the rails 246 and 248.

The system 200 can further include a phase-locked loop (PLL) regulator 260 that is configured to receive a plurality of voltage measurement signals from a plurality of voltage transducers 252. In one embodiment, as shown, each of three voltage transducers 252 is electrically coupled to each one of the three phases of the bus 242. Alternatively, the voltage transducers 252 are electrically coupled to the system bus 216. Also, alternatively, the voltage transducers 252 may be electrically coupled to any portion of the system 200 that facilitates operation of the system 200 as described herein.

In addition, the PLL regulator 260 may be in electronic data communication with the controller 202 and the voltage transducers 252 via a plurality of electrical conduits 254, 256, and 258. Alternatively, the PLL regulator 260 may be configured to receive any number of voltage measurement signals from any number of voltage transducers 252, including, but not limited to, one voltage measurement signal from one voltage transducer 252. The controller 202 can also receive any number of current feedbacks from current transformers or current transducers that are electrically coupled to any portion of the system 200 that facilitates operation of the system 200 as described herein such as, for example, stator current feedback from stator bus 208, grid current feedback from generator side bus 236, and the like.

During operation, the associated electrical power from the generator 118 is transmitted to main transformer 234 via bus 208, switch 206, bus 216, breaker 214 and bus 236. The main transformer 234 steps up the voltage amplitude of the electrical power and the transformed electrical power is further transmitted to a grid via bus 240, circuit breaker 238 and bus 242.

In the doubly-fed induction generator configuration, a second electrical power transmission path is provided. For example, as shown, electrical, three-phase, sinusoidal, AC power is generated within wound the rotor 122 and is transmitted to assembly 210 via the bus 212. Within the assembly 210, the electrical power is transmitted to the rotor filter 218, wherein the electrical power is modified for the rate of change of the PWM signals associated with the converter 220. The power converter 220 acts as a rectifier and rectifies the sinusoidal, three-phase AC power to DC power. The DC power is transmitted into the DC link 244. The capacitor 250 facilitates mitigating DC link voltage amplitude variations by facilitating mitigation of a DC ripple associated with AC rectification.

The DC power is subsequently transmitted from the DC link 244 to line-side converter 222, wherein the converter 222 acts as an inverter configured to convert the DC electrical power from the DC link 244 to three-phase, sinusoidal AC electrical power with pre-determined voltages, currents, and frequencies. This conversion is monitored and controlled via the controller 202. The converted AC power is transmitted from the line-side converter 222 to the bus 216 via buses 227 and 225, line contactor 226, bus 230, circuit breaker 228, and bus 232. The line filter 224 compensates or adjusts for harmonic currents in the electric power transmitted from the line-side converter 222. The stator synchronizing switch 206 is configured to close such that connecting the three-phase power from the stator 120 with the three-phase power from the assembly 210 is facilitated.

The circuit breakers 228, 214, and 238 are configured to disconnect corresponding buses, for example, when current flow is excessive and can damage the components of the system 200. Additional protection components are also provided, including line contactor 226, which may be controlled to form a disconnect by opening a switch (not shown in FIG. 2) corresponding to each of the lines of the line bus 230.

In addition, the assembly 210 may compensate or adjust the frequency of the three-phase power from the rotor 122 for changes, for example, in the wind speed at the hub 110 and the rotor blades 108. Therefore, in this manner, mechanical and electrical rotor frequencies are decoupled and the electrical stator and rotor frequency matching is facilitated substantially independently of the mechanical rotor speed.

The power converter assembly 210 and the generator 118 may be susceptible to grid voltage fluctuations and other forms of grid faults. The generator 118 may store magnetic energy that can be converted to high currents when a generator terminal voltage decreases quickly. Those currents can mitigate life expectancies of components of the assembly 210 that may include, but not be limited to, semiconductor devices such as the IGBTs within the converters 220 and 222.

Similarly, during an islanding event, the generator 118 may become disconnected from the grid. Components that comprise the electrical system 200 such as the busses 208, 216, 232, 230, 236, 240 can store energy that is released during an islanding event. This can result in an overvoltage on the electrical system 200 that connects the generator 118 with the grid. An overvoltage can be a short-term or longer duration increase in the measured voltage of the electrical system over its nominal rating. For example, the overvoltage may be 1%, 5% 10%, 50%, 150% or greater, and any values therebetween, of the measured voltage over the nominal voltage.

Another challenge presented to the electrical system 200 during an islanding event is that the converter 210 and the generator 118 may experience an extremely high impedance grid and will most likely have almost no ability to export real power. If the turbine is operating at a significant power level, that energy must be consumed, and there is a tendency for that energy to find its way into the DC link 244 that couples the two converters 220, 222, as described below. This power flow can occur into the DC link 244 by the power semiconductors of either the line 222 or rotor converter 220. For systems similar to the one shown in FIG. 2, the use of a crowbar circuit, as known in the art, at the terminal of the rotor converter 220 may be used to protect the power semiconductors in many events, but the application of the crowbar during an islanding event may increase the risk of damage.

Figure 4A:
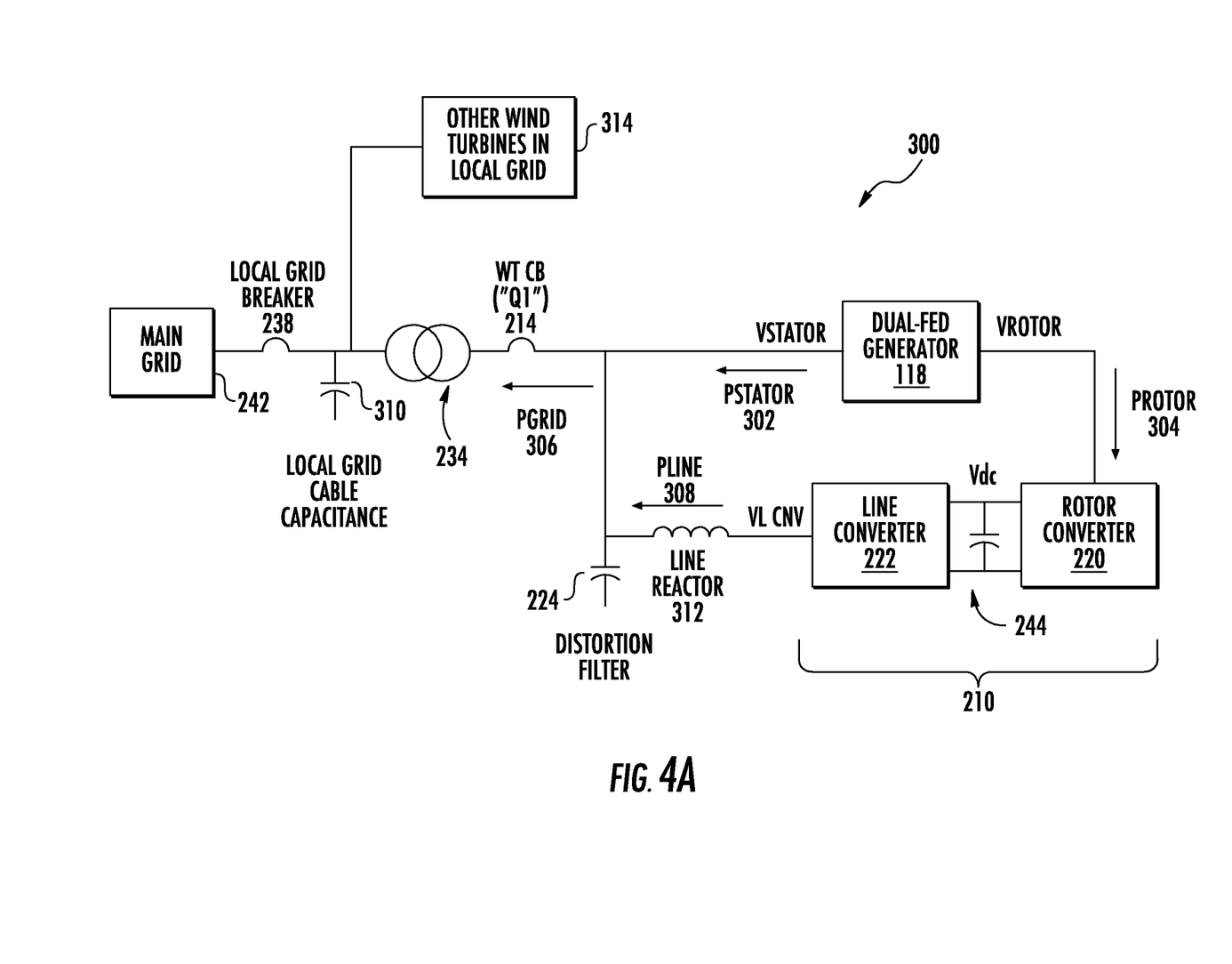
FIG. 4A illustrates a schematic diagram of one embodiment of a normal operating condition of a wind turbine in a wind farm according to the present disclosure.

The normal operating condition of a wind turbine in a wind farm is illustrated in FIG. 4A. More specifically, FIG. 4A illustrates power flows within the power converter 210 and the wind farm electrical system 300 during super-synchronous operation, typical of moderate to high wind conditions. As shown, the power from the generator 118 splits in two paths, one power flow (PStator) 302 flows directly from the stator 120 into the grid connection 242, the other power flow (PRotor) 304 via the rotor 122 which passes though the rotor converter 220, to the DC link 244, to the line-side converter 222, through a line reactor 312 (not required) and then on to the grid connection point 242. The sum (Pgrid) 306 of the two power flows 302, 304 are the net output of the generator 118. Note that the split of power between the generator rotor 122 and the stator 120 is a function of rotor speed relative to synchronous. Similarly, power from other wind turbines 314 in the wind farm flows from the local grid to the grid connection point 242. At super-synchronous operation, the rotor speed is higher than synchronous and the power splits as shown. At sub-synchronous operation, the rotor speed is less than synchronous and the rotor winding 122 draws power from the rotor converter 220, i.e. the power flow through the converters 222, 220.

Figure 4B:
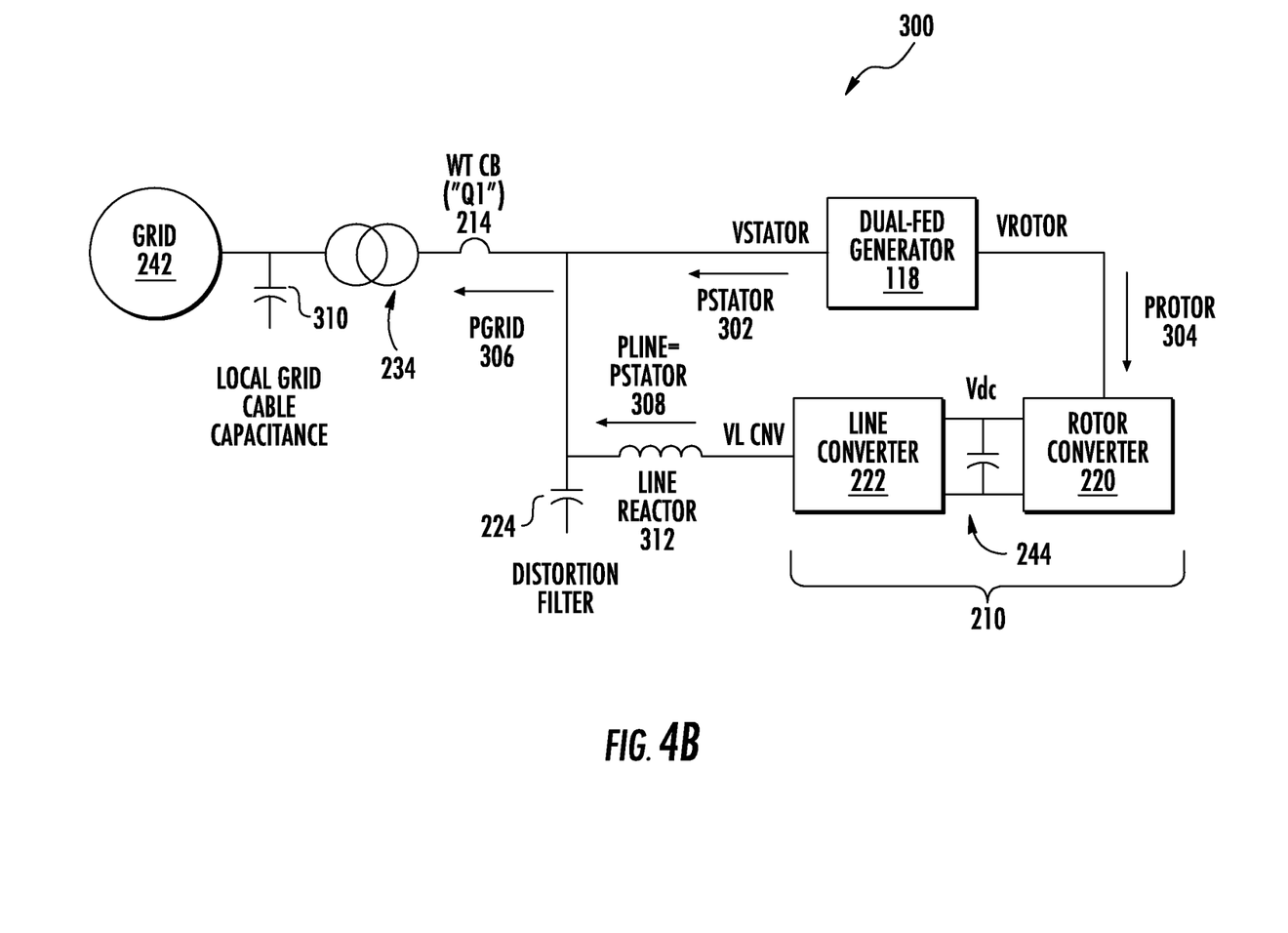
FIG. 4B illustrates a schematic diagram of one embodiment of conditions when a remote breaker opens leaving the wind farm in an islanded condition according to the present disclosure.

FIG. 4B illustrates the conditions when a remote breaker opens leaving the wind farm in an islanded condition and the power flow to the grid 242 is suddenly interrupted for a case where the rotor torque and speed remain the same as pre-islanding condition. The power (PLine) 308 on the line converter 222 is suddenly forced to reverse, since the power that was flowing from the stator 120 to the grid 242 now has only the line converter 222 as a path. This causes the voltage on the DC link 244 to rise very rapidly. When an islanded condition occurs, it is desirable to disconnect the wind turbine 118 from the grid 242 in a manner that does not cause damage to components of the electrical system 300. However, damage to components can happen in a few milliseconds, which is typically faster than circuit breakers can operate. Control action is needed quickly to prevent damaging voltage levels. Also, as described above, the remote breaker opening may leave some portion of the local grid connected to the generator 118, e.g. cables that make up the wind farm collector system, etc. This capacitance 310 can be a source of AC voltage amplification on the remaining network.

Figure 5:
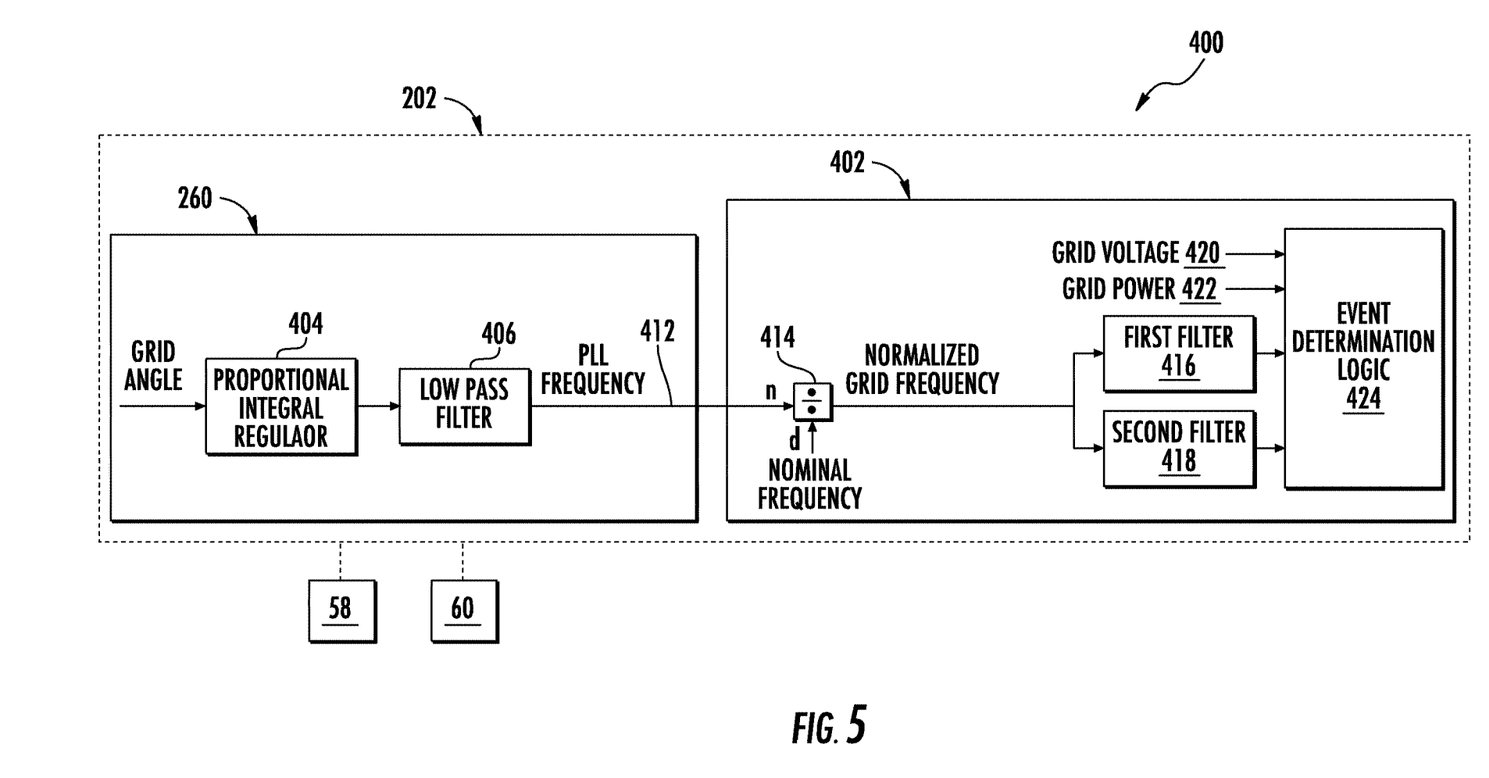
FIG. 5 illustrates a schematic diagram of one embodiment of a system for controlling the generator in response to a high-voltage grid event according to the present disclosure.

Referring now to FIG. 5, a schematic diagram of one embodiment of a system 400 for controlling the generator 118 in response to a high-voltage grid event according to the present disclosure is illustrated. As shown, the system 400 may include one or more sensors (such as sensors 58, 60) for measuring a voltage feedback of the power grid 242, the PLL regulator 260 for generating a frequency signal (e.g. PLL frequency) of the power grid 242, a filtering assembly 402, and the controller 202. More specifically, as shown, the PLL regulator 260 is configured to determine the frequency signal based on a grid angle (which can be ascertained from the voltage feedback). Thus, as shown, the PLL regulator 260 may detect the grid voltage and derive the frequency therefrom. A proportional integral regulator 404 receives the grid angle and filters the signal via a filter (e.g. low-pass filter 406).

Still referring to FIG. 5, the filtering assembly 402 is configured to filter the frequency signal 412 so as to determine whether certain types of grid conditions are present in the power grid 242. More specifically, as shown, the filtering assembly 402 may receive the frequency signal 412 and divide the signal by a nominal frequency value at 414. The output (e.g. Normalized Grid Frequency) may then be further filtered by a first filter 416 connected in parallel with a second filter 418. Further, the first filter 416 may have a bandwidth that is greater than the second filter 418. Thus, in certain embodiments, the first filter 416 may be a high-bandwidth filter and the second filter 418 may be a low-bandwidth filter. In another embodiment, the first and second filters 416, 418 may be low-pass filters.

In such embodiments, the filtering assembly 402 is capable of distinguishing between the certain types of grid conditions using the high-bandwidth filter 416 and the low-bandwidth filter 418. In addition, for particular embodiments, the certain types of grid conditions may include, for example, a high-voltage-ride through (HVRT) event, a weak grid, or an islanding event. For example, in an embodiment, the filtering assembly 402 may distinguish HVRT events and/or a weak grid condition (where no significant frequency deviations from nominal are expected) by using the high-bandwidth 416. In addition, the filtering assembly 402 may distinguish islanding events by using the low-bandwidth 418.

At 424, the controller 202 is configured to compare the output signals of the first and second filters 416, 418 of the filtering assembly 402 to one or more frequency thresholds and control the generator 118 based on the comparison. More specifically, in an embodiment, if the output signal of the high-bandwidth filter 416 indicates that the HVRT event is the grid condition (i.e. the signal exceeds a certain frequency threshold), the controller 202 is configured to control the generator 118 so as to maintain connection of the generator 118 to the power grid 242 to meet ride-through grid requirements thereof. In another embodiment, if the output signal of the high-bandwidth filter 416 indicates that the weak grid is the grid condition, the controller 202 is configured to continue operation of the generator 118 per the status quo. In yet another embodiment, if the output signal of the low-bandwidth filter 418 indicates that the islanding event is the grid condition, the controller 202 is configured to disconnect or trip the generator 118 from the power grid 242. In addition, as shown, the controller 202 may also receive a grid voltage 420 and/or a grid power 422 and further determine the control action based thereon.

As described above and as will be appreciated by one skilled in the art, embodiments of the present invention may be configured as a system, method, or a computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a dual-fed induction generator (DFIG) connected to a power grid in response to a high-voltage grid event, the method comprising:
   receiving, via a controller, a frequency signal of the power grid;
   providing a filtering assembly with a high-bandwidth filter and a low-bandwidth filter connected in parallel;
   filtering the frequency signal via the filtering assembly so as to distinguish between certain types of grid conditions occurring in the power grid using the high-bandwidth filter and the low-bandwidth filter, the high-bandwidth filter comprising a bandwidth that is greater than the low-bandwidth filter;
   comparing output signals of the high-bandwidth and low-bandwidth filters of the filtering assembly to one or more frequency thresholds; and,
   controlling the DFIG based on the comparison.

2. The method of claim 1, further comprising measuring a voltage from the power grid via one or more sensors and determining the frequency signal based on the voltage.

3. The method of claim 1, wherein the high-bandwidth and low-bandwidth filters are low-pass filters.

4. The method of claim 1, wherein the certain types of grid conditions comprise at least one of a high-voltage-ride through (HVRT) event, a weak grid, or an islanding event.

5. The method of claim 4, wherein distinguishing between the certain types of grid conditions using the high-bandwidth filter and the low-bandwidth filter further comprises determining whether the HVRT event or the weak grid is present in the power grid based on an output signal of the high-bandwidth filter.

6. The method of claim 4, wherein distinguishing between the certain types of grid conditions using the high-bandwidth filter and the low-bandwidth filter further comprises determining whether the islanding event is present in the power grid based an output signal of the low-bandwidth filter.

7. The method of claim 5, wherein if the output signal of the high-bandwidth filter indicates that the HVRT event is the grid condition, controlling the DFIG based on the comparison further comprises maintaining connection to the power grid so as to meet ride-through grid requirements of the power grid.

8. The method of claim 5, wherein if the output signal of the high-bandwidth filter indicates that the weak grid is the grid condition, controlling the DFIG based on the comparison further comprises continuing operation of the DFIG.

9. The method of claim 6, wherein if the output signal of the low-bandwidth filter indicates that the islanding event is the grid condition, controlling the DFIG based on the comparison further comprises disconnecting the DFIG from the power grid.

10. The method of claim 1, further comprising controlling the DFIG based on the comparison and at least one of a grid voltage or a grid power.

11. The method of claim 1, further comprising:
receiving, via a phase-locked loop (PLL) of the controller, a voltage feedback signal from the power grid; and,
generating, via the PLL, the frequency signal of the power grid based on the voltage feedback signal.

12. A system for controlling a dual-fed induction generator (DFIG) connected to a power grid in response to a high-voltage grid event, the system comprising:
one or more sensors for measuring a voltage feedback of the power grid;
a phase-locked loop for generating a frequency signal of the power grid based on the voltage feedback signal;
a filtering assembly comprising a high-bandwidth filter and a low-bandwidth filter connected in parallel for filtering the frequency signal so as to distinguish between certain types of grid conditions occurring in the power grid the high-bandwidth filter comprising a bandwidth that is greater than the low-bandwidth filter; and,
a controller configured to perform a plurality of operations, the plurality of operations comprising:
comparing output signals of the high-bandwidth and low-bandwidth filters of the filtering assembly to one or more frequency thresholds; and,
controlling the DFIG based on the comparison;

comparing output signals of the high-bandwidth and low-bandwidth filters of the filtering assembly to one or more frequency thresholds; and,
controlling the DFIG based on the comparison.

13. The system of claim 12, wherein the high-bandwidth and low-bandwidth filters are low-pass filters.

14. The system of claim 12, wherein the certain types of grid conditions comprise at least one of a high-voltage-ride through (HVRT) event, a weak grid, or an islanding event.

15. The system of claim 14, wherein the filtering assembly is configured to distinguish between the certain types of grid conditions by determining whether the HVRT event or the weak grid is present in the power grid based on an output signal of the high-bandwidth filter.

16. The system of claim 14, wherein the filtering assembly is configured to distinguish between the certain types of grid conditions by determining whether the islanding event is present in the power grid based an output signal of the low-bandwidth filter.

17. The system of claim 15, wherein if the output signal of the high-bandwidth filter indicates that the HVRT event or the weak grid is the grid condition, controlling the DFIG based on the comparison further comprises continuing operation of the DFIG.

18. The system of claim 16, wherein if the output signal of the low-bandwidth filter indicates that the islanding event is the grid condition, controlling the DFIG based on the comparison further comprises disconnecting the DFIG from the power grid.

* * * * *